United States Patent
Schmidt et al.

(10) Patent No.: US 6,516,939 B1
(45) Date of Patent: Feb. 11, 2003

(54) DEVICE FOR TRANSPORTING BOTTLES

(75) Inventors: Andreas Schmidt, Ahaus (DE); Thomas Niehr, Ahaus (DE)

(73) Assignee: GEA Finnah GmbH, Ahaus (DE)

( * ) Notice: Subject to any disclaimer, the term of this patent is extended or adjusted under 35 U.S.C. 154(b) by 0 days.

(21) Appl. No.: 09/806,217

(22) PCT Filed: Nov. 9, 1999

(86) PCT No.: PCT/EP99/08563

§ 371 (c)(1),
(2), (4) Date: Jun. 1, 2001

(87) PCT Pub. No.: WO00/37353

PCT Pub. Date: Jun. 29, 2000

(30) Foreign Application Priority Data

Dec. 7, 1998 (DE) .......................... 298 21 746

(51) Int. Cl.⁷ ............................... B65G 47/26
(52) U.S. Cl. ................... 198/458; 198/430; 198/432; 198/681; 198/803.14; 141/169; 141/170
(58) Field of Search ................. 198/426, 427, 198/429, 430, 432, 458, 681, 803.14, 803.15; 141/169, 170, 178, 237

(56) References Cited

U.S. PATENT DOCUMENTS

| | | | | |
|---|---|---|---|---|
| 1,346,613 A | * | 7/1920 | Taliaferro et al. ............ | 141/170 |
| 2,488,230 A | * | 11/1949 | Page .......................... | 198/458 |
| 3,767,027 A | * | 10/1973 | Pund et al. ................. | 198/458 |
| 5,662,207 A | * | 9/1997 | Lehmann .................... | 198/427 |
| 6,341,630 B2 | * | 1/2002 | Reinecke .................... | 141/169 |

FOREIGN PATENT DOCUMENTS

DE 19702770 * 7/1998

* cited by examiner

*Primary Examiner*—Joseph E. Valenza
(74) *Attorney, Agent, or Firm*—Jordan and Hamburg LLP (57) ABSTRACT

For transporting bottles with a carrying ring in the neck region, particularly PET bottles, along a specified path of motion through processing stations (2, 3, 4, 5, 6), of a processing installation particularly a bottle-filling installation, in each case a number of bottles (8), grouped in a row (9) transversely to the direction of transport (20), is transported by a carrier (13) and positioned relative to the latter. The carriers (13) can be moved by conveying chains (11) or similar driving means at uniform intervals consecutively from a bottle feeding station (1) past at least one processing station, especially a filling station, to a bottle delivery station (7) and, from there, empty back to the bottle feeding station. As carrier for a row (9) of bottles (8), a cellular board-like flat carrying strip (13) is provided. Each bottle (8) is supported suspended with its neck (25) in an opening (16; 30) of the carrying strip (13), the carrying ring (24), at the neck (25) of the bottles (8) overlapping the edge of the opening (16; 30) in the carrying strip (13). Above the plane of motion (15) of the carrying strips (13) on their way between the bottle feeding station (1) and the bottle delivery station (7), guiding strips (21, 22) are provided, which are disposed parallel next to one another, are parallel to the plane of motion (15) and, between themselves, form the boundaries of the guiding paths (23) for the necks parts (25) of the bottles (8), which protrude over the carrying strips (13) and extend between the guiding strips (21), (22).

55 Claims, 14 Drawing Sheets

DEVICE FOR TRANSPORTING BOTTLES

BACKGROUND OF THE INVENTION

The device relates to a device for transporting bottles with a carrying ring in the neck region, particularly PET bottles, along a specified path of motion through processing stations of a processing installation, particularly a bottle-filling installation.

The invention is concerned with the problem of creating a transporting device of the type mentioned which, with simple means, ensures that the bottles are transported reliably along the path of motion and guarantees an exact positioning of the bottles on their path through the processing stations.

SUMMARY OF THE INVENTION

The inventive transporting device makes possible a rapid and reliable transfer from a group of bottles, forming a row of bottles, to the carrying strips, in which the bottles of a row are supported at a variable distance from one another, so that the bottles, after being transferred to the carrying strips, can be aligned accurately, in order to be able to assume the positions required in the processing stations. The guiding strips moreover form extremely simple positioning means, which can fulfill their positioning tasks reliably, even when the transporting output is high. Moreover, the guiding strips also secure the bottles against unintended detached from their transport openings during the transport.

Further details and effects arise out of the following description and the drawing, in which two examples of the invention are illustrated in greater detail diagrammatically.

DESCRIPTION OF THE PREFERRED EMBODIMENTS

The processing installation for bottles, illustrated in FIGS. 1 to 7, is used, for example, for sterilizing and filling the bottles. It may, however, comprise any processing station or combination of processing stations, as may be desirable in a particular case. The processing station shown comprises a tightly closed bottle feeding station 1, sterilization and drying stations 2, 3, a filling station, which is not shown, a station 4 for adding liquid carbon dioxide or similar liquid or gaseous additives, a lid placement station 5, a closing station 6 and a bottle delivery station 7. All stations are tightly closed and the shutting-off parts of the housing enclose a conveying channel, in which there is a sterile atmosphere at least sectionally.

An endless conveyor 10 with external conveying chains 11 or similar driving elements, which revolve around chain wheels 12 or similar guiding wheels, transport the bottles 8, which are to be processed and of which in each case at least a majority are combined into a group 9. Carriers, which are in the shape of cellular board-like flat carrying strips 13 and are aligned at right angles to the direction of motion, extend between the conveying chains 11. The carrying strips 13 are connected over connecting pieces 14 with the conveying chains 11 and, in the working compartment of the conveyor 10, run in a horizontal movement plane 15, located somewhat below the plane of the chain, from the bottle feeding station 1 to the bottle delivery station 7. Over their whole length, the bottle conveying chains 11 are equipped with carrying strips, which extend at the same distance from one another.

Figure 1:
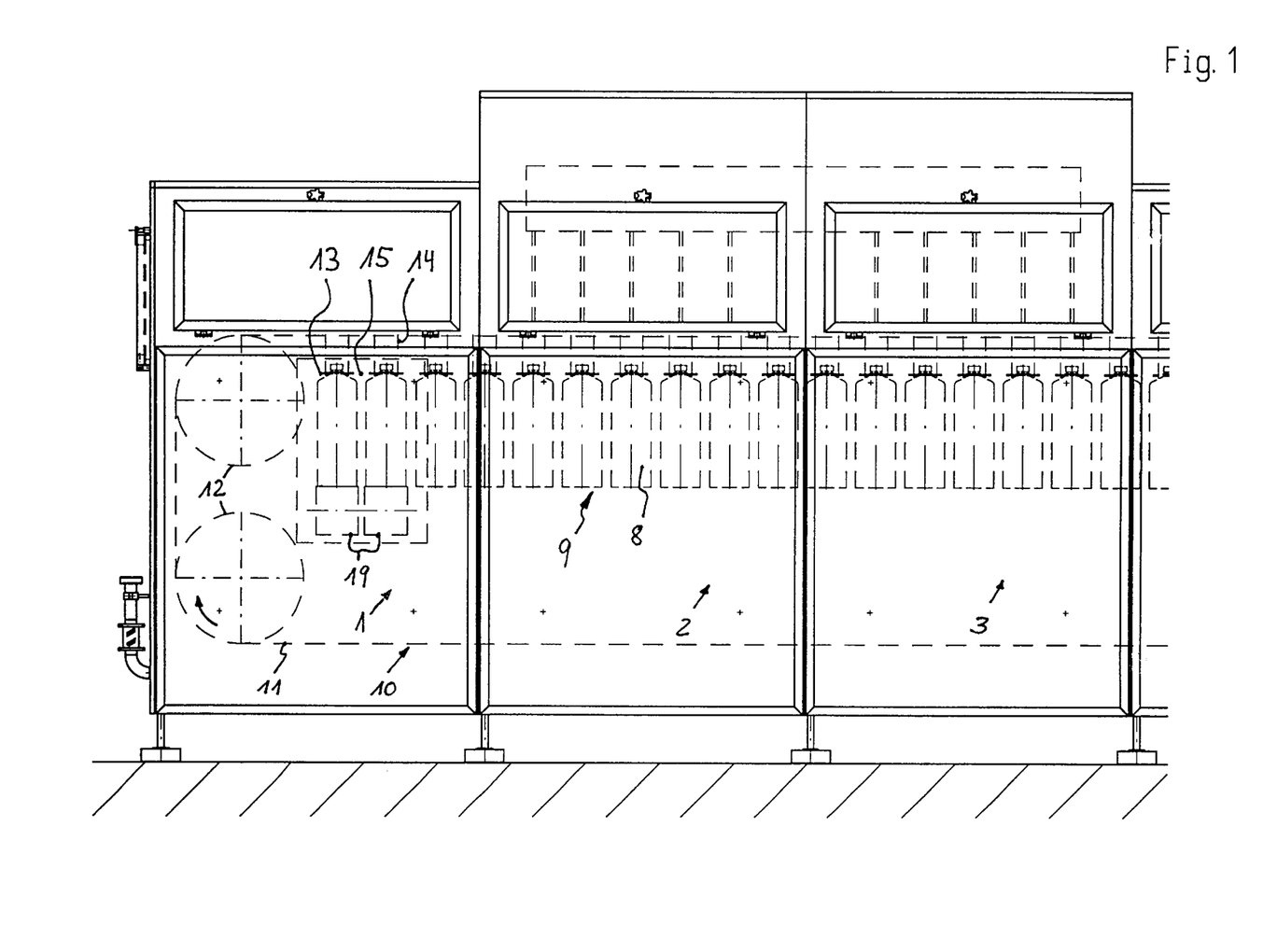
FIG. 1 shows a truncated side view of the inlet region of a processing installation with a first version of an inventive transporting device.
Figure 2:
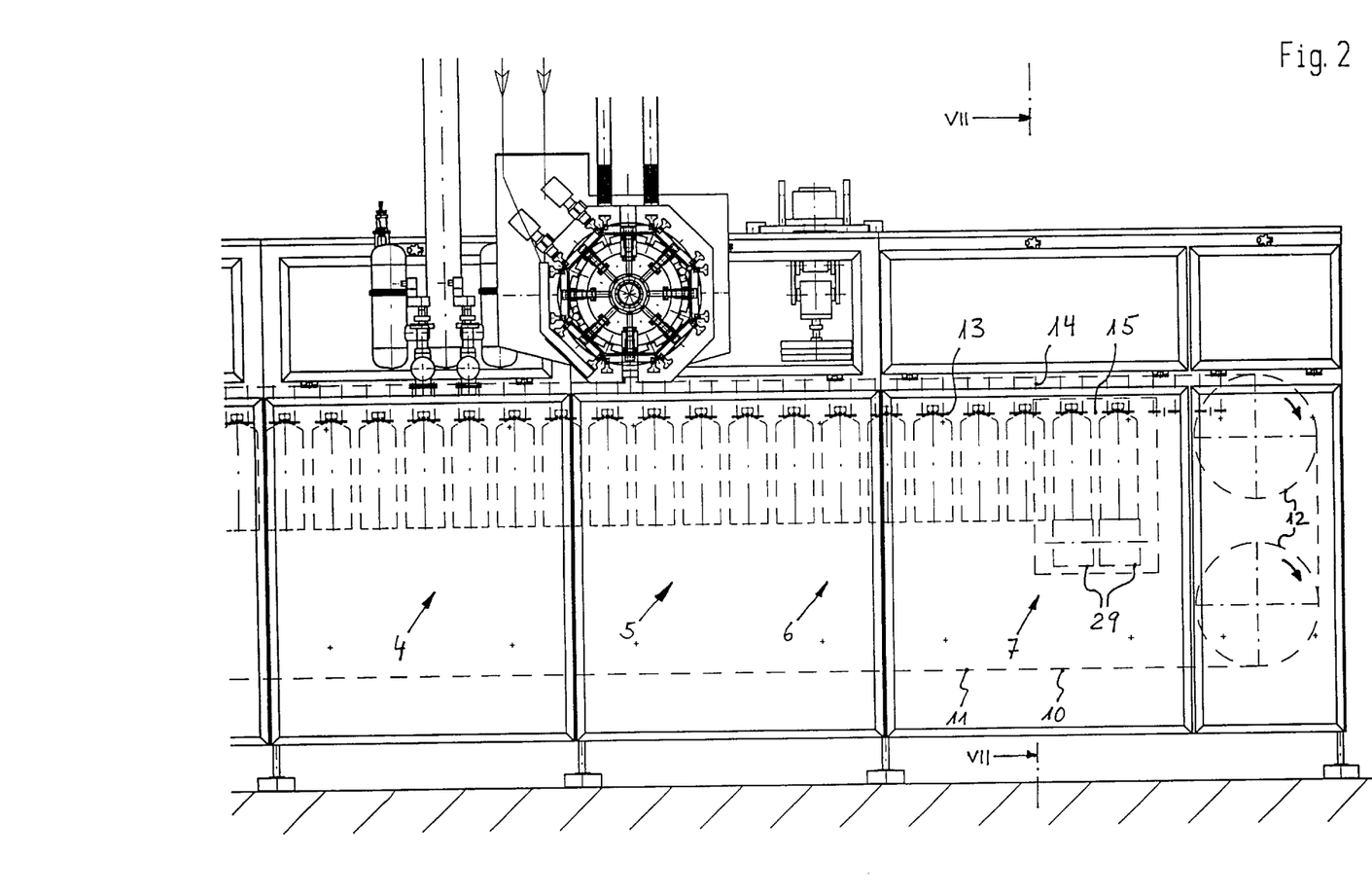
FIG. 2 shows a side view, similar to that of FIG. 1, of the end region of the processing installation of FIG. 1.
Figure 3:
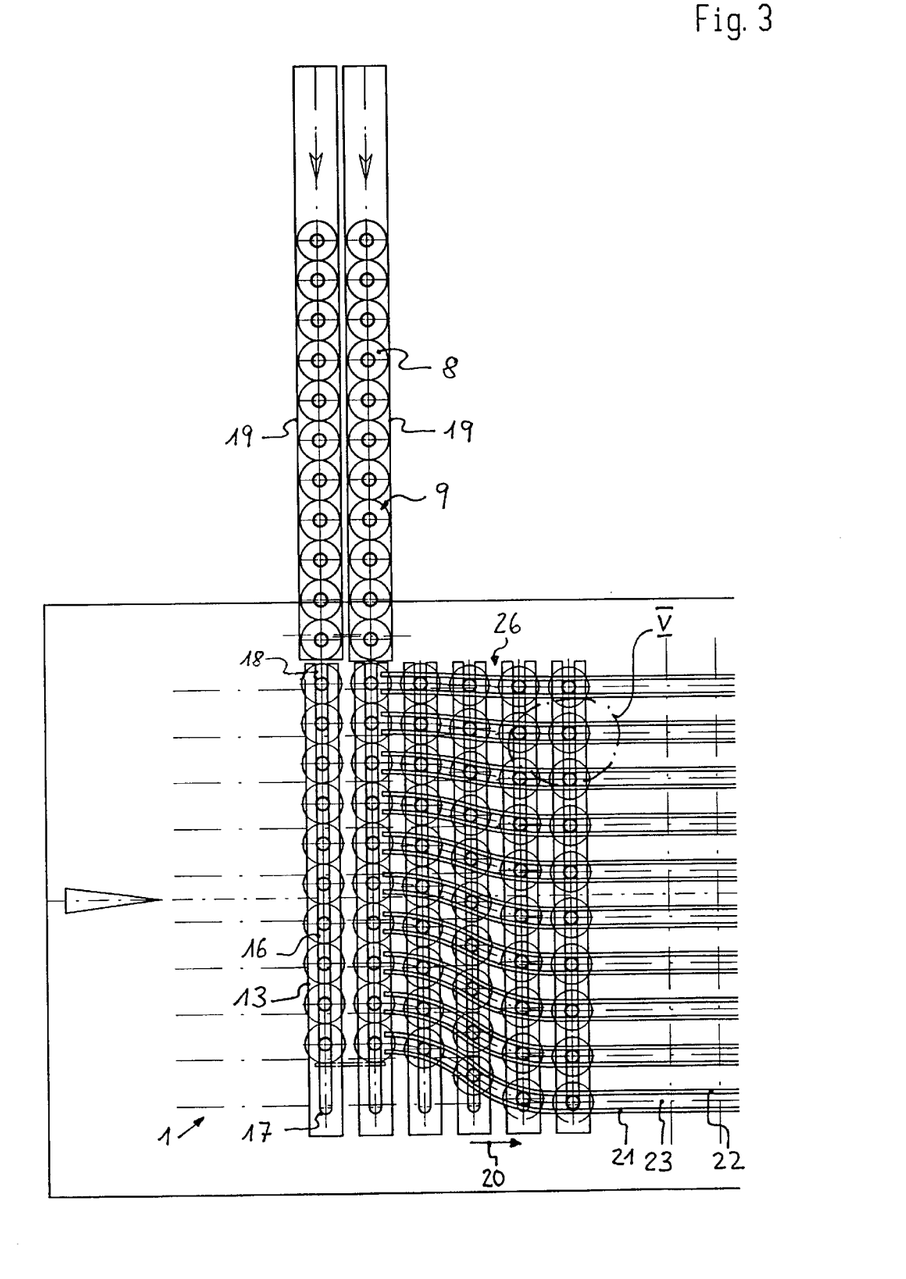
FIG. 3 shows a simplified plan view of FIG. 1.
Figure 4:
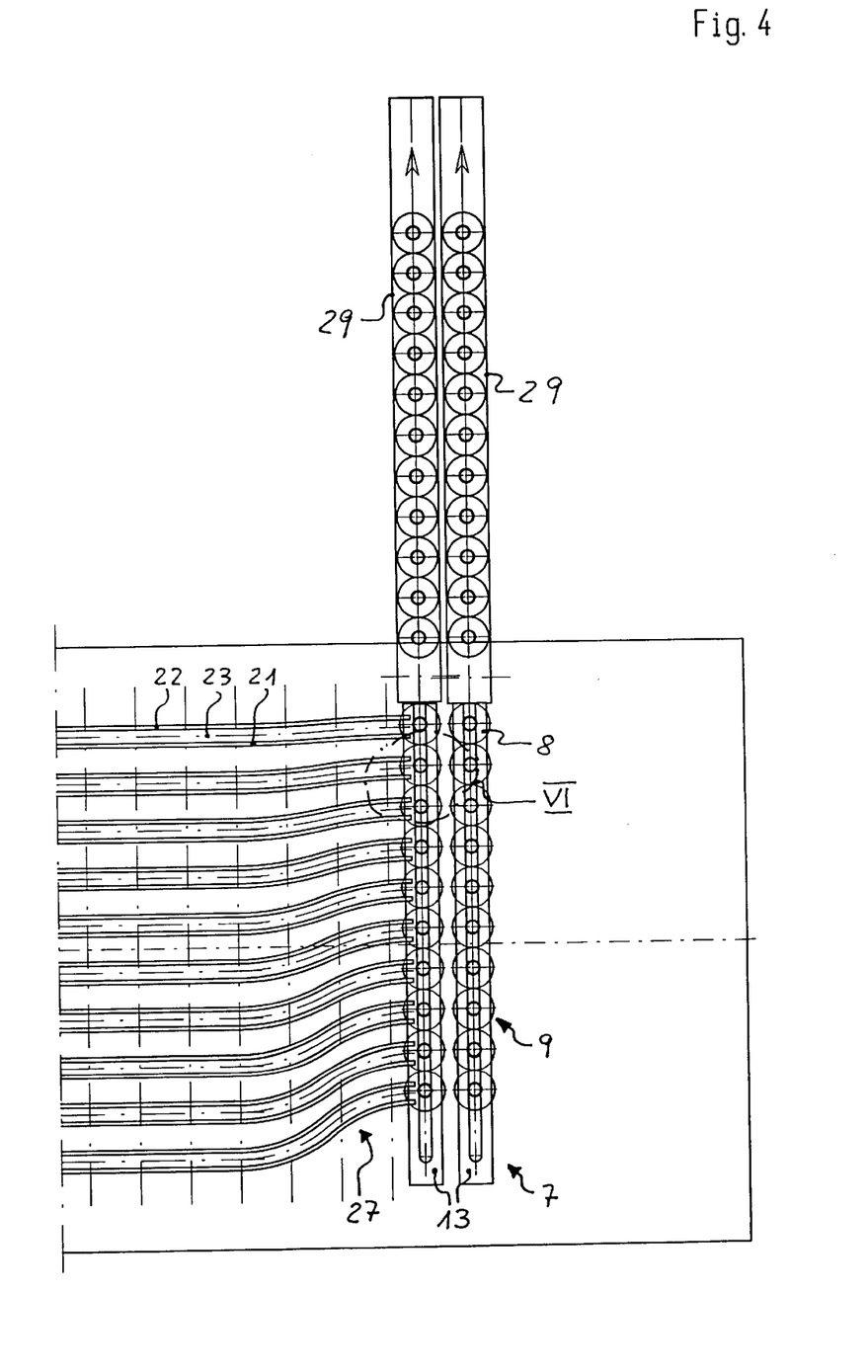
FIG. 4 shows a simplified plan view of FIG. 2.
Figure 5:
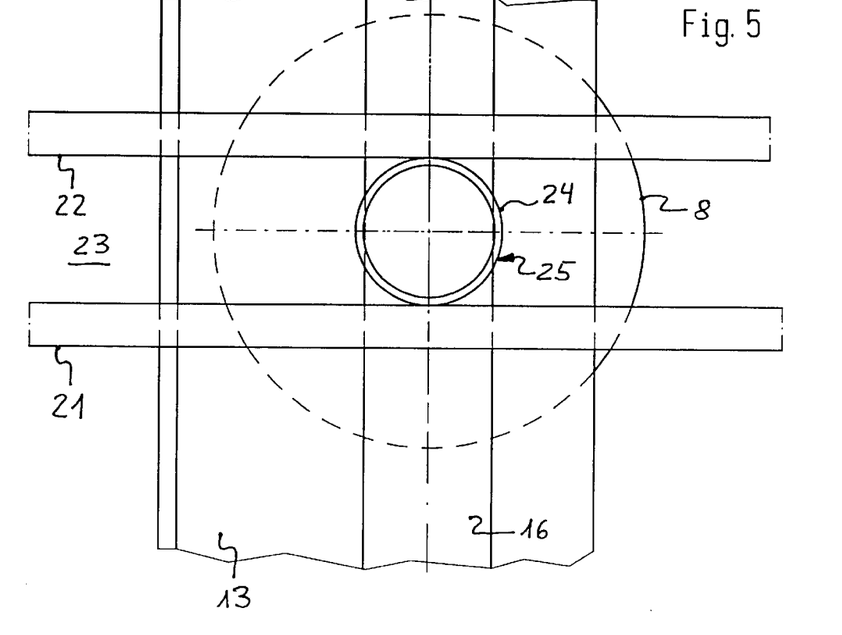
FIG. 5 shows a detail V of FIG. 3 as an enlargement.
Figure 6:
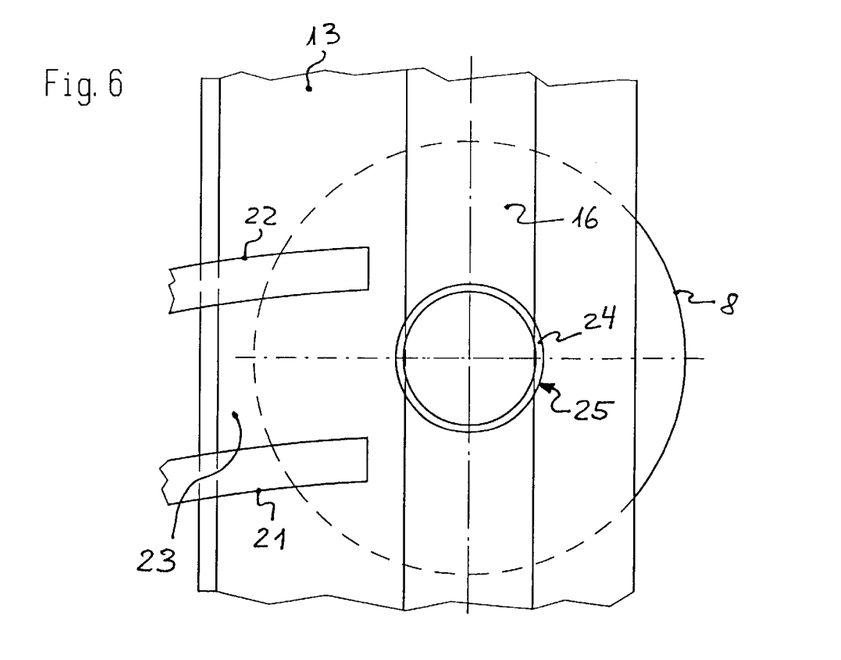
FIG. 6 shows a detail V of FIG. 4 as an enlargement.
Figure 7:
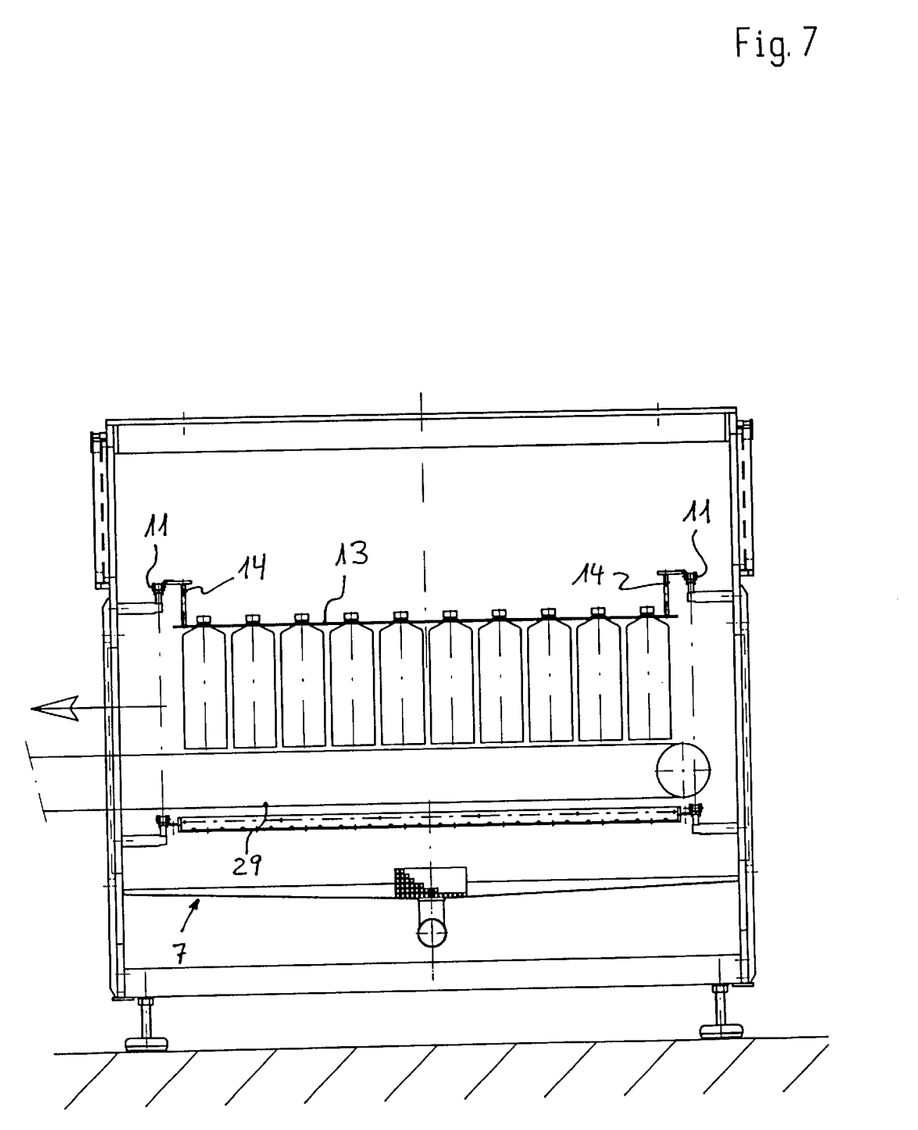
FIG. 7 shows a section along the line VII—VII of FIG. 2.

For the constructions of FIGS. 1 to 7, the carrying strips 13 have a longitudinal slot 16, which extends essentially over their whole length and is closed at one end 17 and open at the other 18. An adjustable stop 17', which forms the boundary for the position of the first bottle 8 of a row 9 of bottles, conveyed into the supporting strip, is assigned to the closed end 17. This longitudinal slot forms a continuous opening 16 for jointly taking up the bottles 8 of a row or group of bottles 9, so that each bottle is supported suspended with its neck in the opening 16 of the supporting strip 13, the carrying ring 24, provided at the neck 25 of the bottle 8, overlapping the edge of the opening 16 in the carrying strip 13 (FIGS. 5 and 6). The bottles 8, suspended in this manner in the supporting strips 13, protrude with their neck part 25, adjoining the filler opening, above the supporting strip 13.

Bottles 8 are supplied in each case in two groups 8 to the bottle loading station with the help of conveyors 19, which are constructed as conveyor belts, but may also have any other suitable configuration. The adjoining, consecutively transported bottles 8 are threaded into the two carrying strips, which are stationary in the bottle feeding station 1, whereupon the endless conveyor 10 is set in motion in the direction of motion 20 (FIG. 3). For this purpose, suitable driving motors are provided, which act on chain wheels 12 and the details of which are not shown.

Above the plane of motion 15 of the supporting strips 13, on the their way between the bottle feeding station and the bottle discharging station 1 to 7, a number of guiding strips 21, 22 are provided, which in each case extend in pairs to one another and parallel to the plane of motion 15 and, between themselves, form the boundaries for the guiding paths 23 for the neck parts 25 of the bottles 8, which protrude over the supporting strips 13 and extend between the guiding strips 21, 22. A separate pair of guiding strips 21, 22 is provided for each bottle 8 of a series of bottles 9. At their ends adjacent to the bottle feeding station 1, the guiding paths are opposite to the necks 25 of adjoining bottles 8 disposed next to one another in the row. In the region 26 adjoining their inlet ends, the guiding paths 23 then change over in an arched course to greater distances from one another, which subsequently remain constant and correspond to those, which the bottles are to assume during their processing in the subsequent processing stations, in order to ensure satisfactory processing.

In the same way, the guiding paths 23 are brought together in the region 27 directly before the ends of the guiding strips 21, 22, adjoining the bottle delivery station 7, by an arched course, so that the bottles 8 of a row 9 assume an adjoining position once again during the delivery.

By a movement of each supporting strip 13, the bottles 8 correspondingly are moved apart in this supporting strip 13 and, after passing the last processing station, brought together once again, as is desirable for further handling. In each phase of the processing, the bottles 8 not only assume a precise position within the row 9, they are also secured against an unintentional detachment from the supporting strips 13 by the interaction of the edges of the opening 16 in the supporting strips 13 and the guiding strips 21, 22.

After the bottles are brought together in the region adjoining the bottle delivery station 7, the bottles 8 with their necks 25 are moved out of the guiding paths 23 and, in the discharging position shown in FIG. 4, the bottles 8 are above the conveyors 29, for example, belt conveyors, which transport the bottles 8, after they have been raised slightly, out of the longitudinal slots 16 of the two supporting strips above them.

Figure 8:
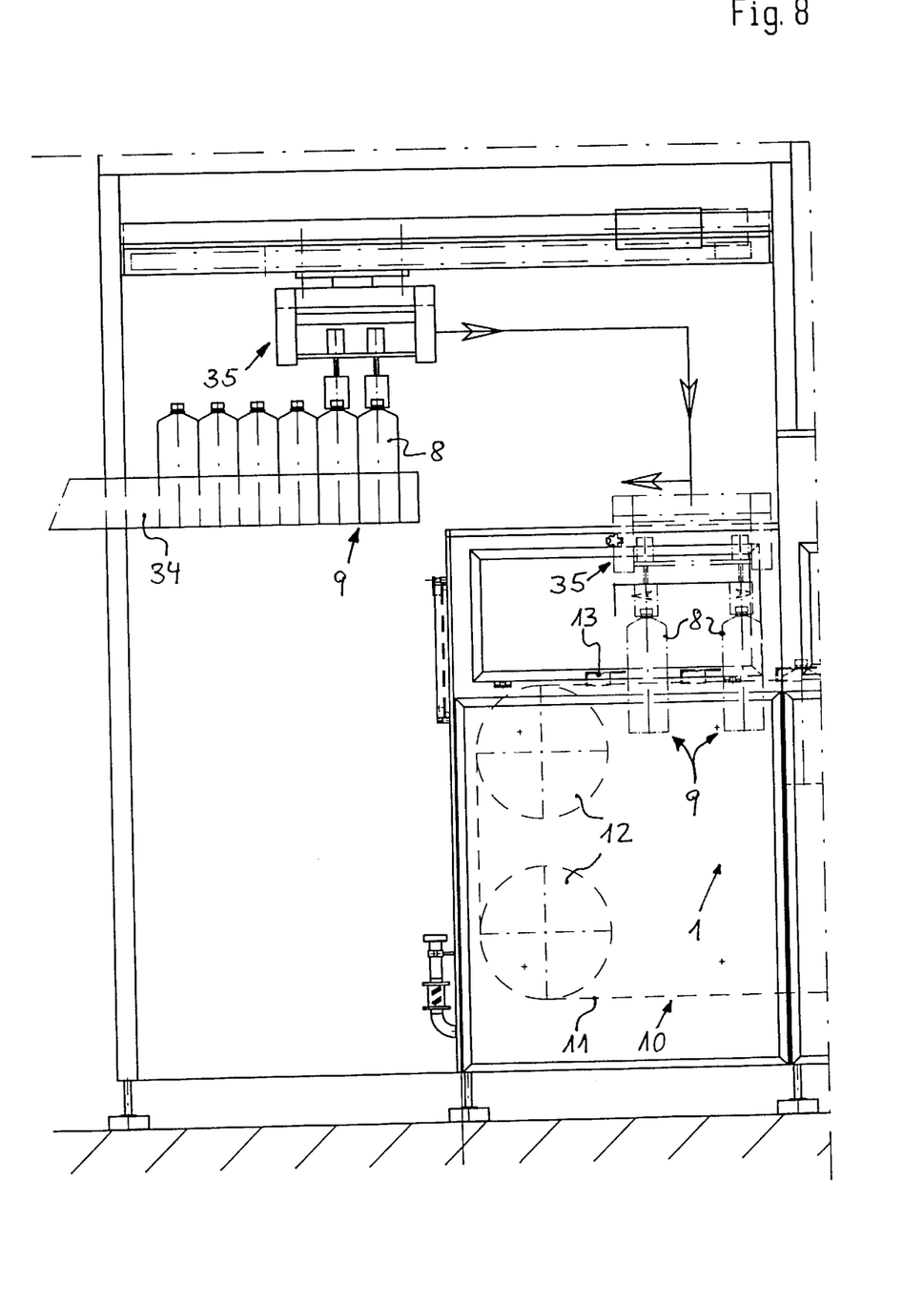
FIG. 8 shows a truncated side view, similar to that of FIG. 1, of the inlet region of a processing installation with a second version of an inventive transporting device.
Figure 9:
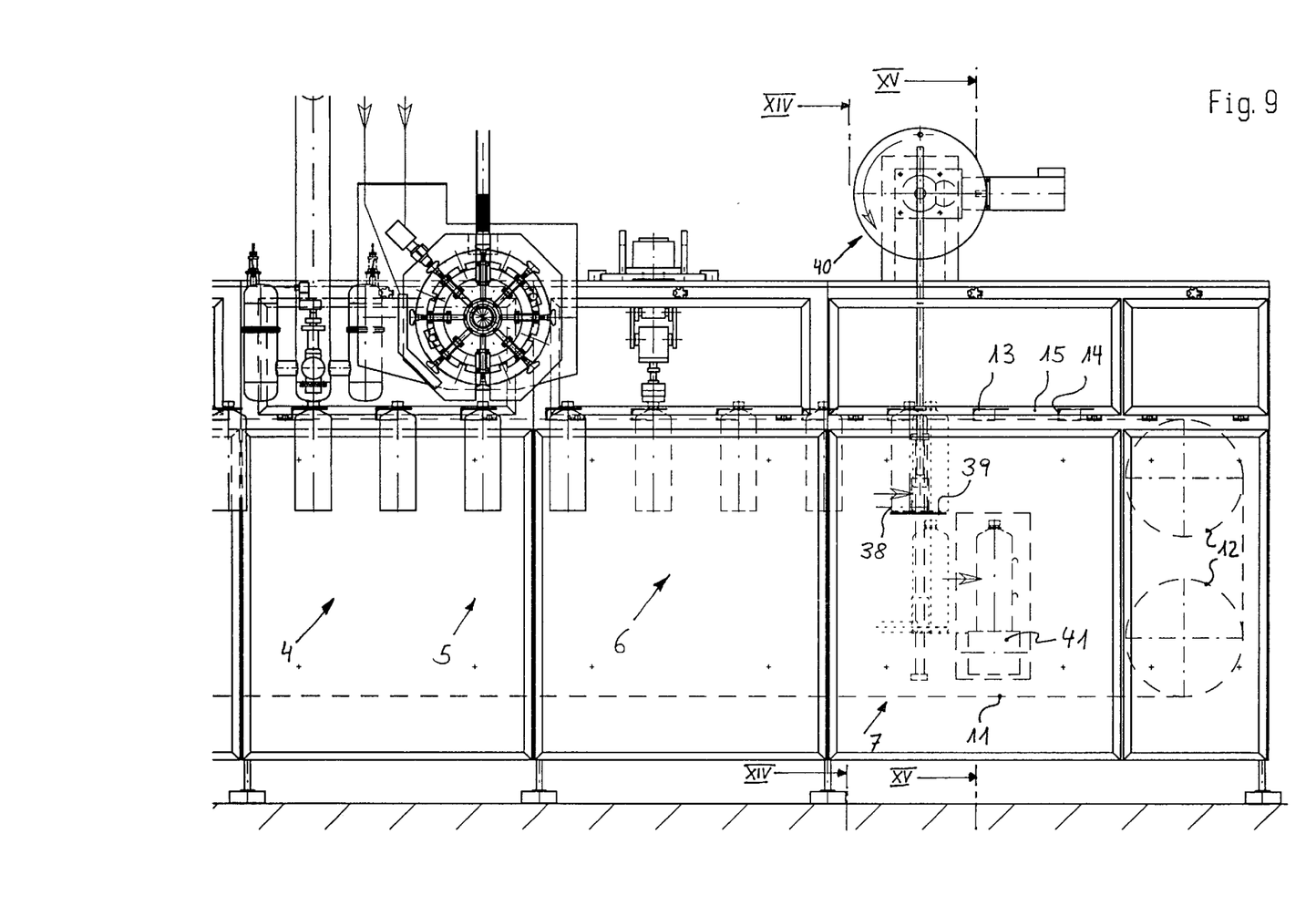
FIG. 9 shows a side view, similar to that of FIG. 2, of the processing installation of FIG. 8.
Figure 10:
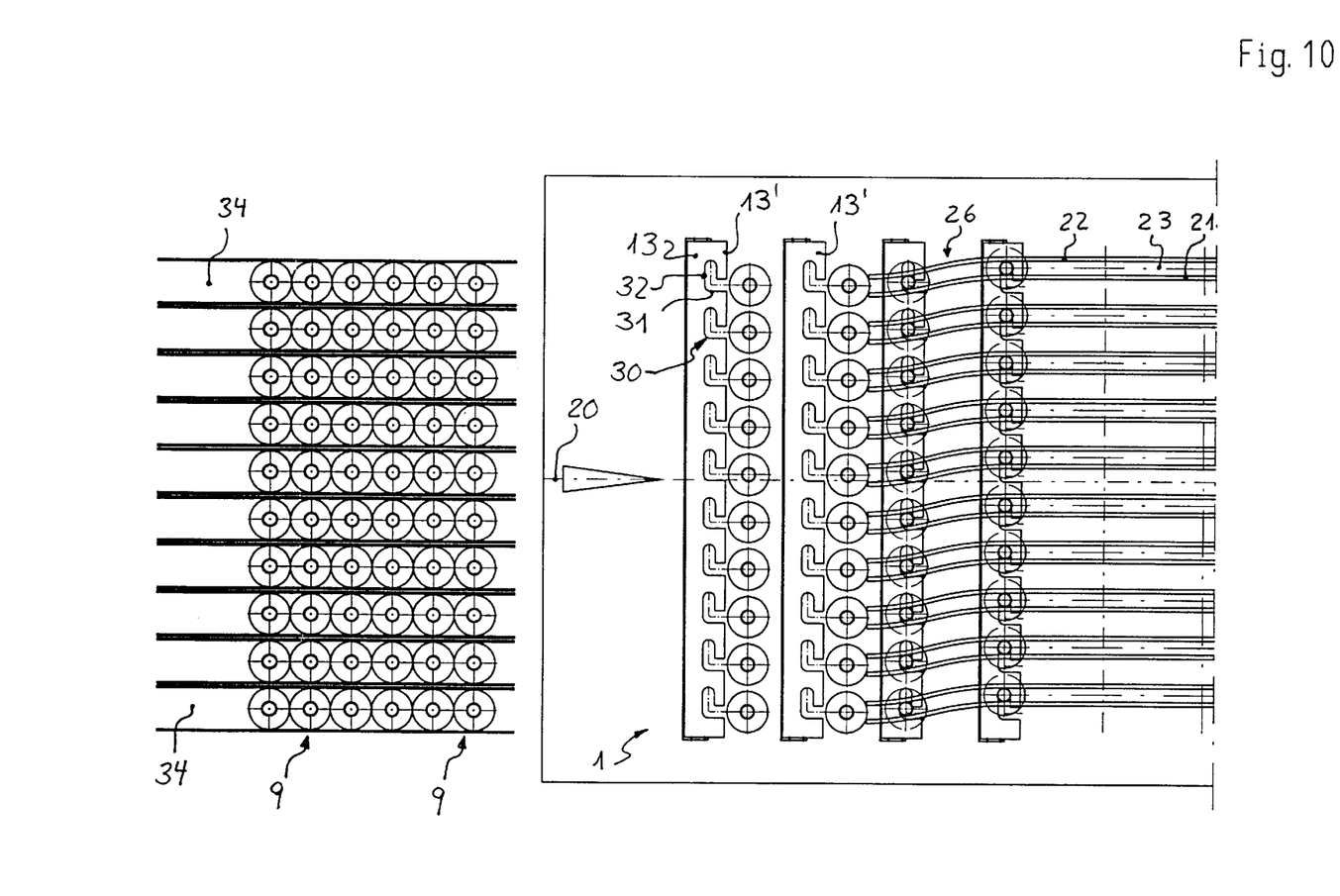
FIG. 10 shows a simplified plan view of FIG. 8.
Figure 11:
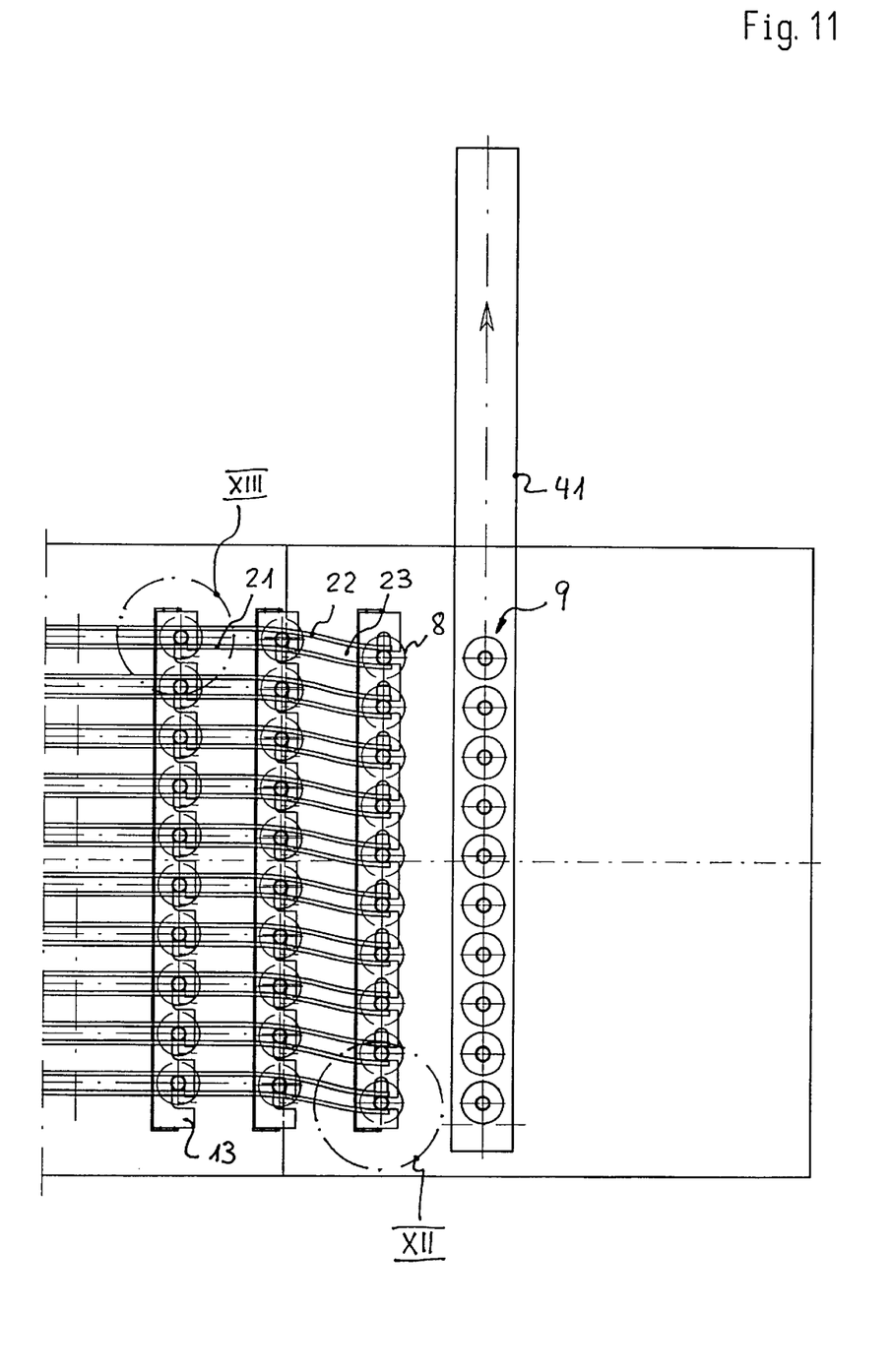
FIG. 11 shows a simplified plan view of FIG. 9.

The processing installation, shown in FIGS. 8 to 15, corresponds essentially to that of FIGS. 1 to 7, so that corresponding components have been given the same reference numbers. The construction of the supporting strips 13 is different; they have individual openings 30 for accommodating in each case a single bottle. Correspondingly, the supporting strips 13 have a number of, for example 10 individual openings 30, corresponding to the number of bottles 8 in a row. In the version of FIG. 10, the individual openings 30 are L-shaped in plan view. Each individual opening 30 has a first leg 31, which is aligned parallel to the direction of motion 20 of the supporting strips 13 and adjoining a longitudinal edge 13' of the supporting strip 12, as inlet and outlet part and a second leg 32, extending transversely to the direction of motion 20 of the supporting strips 13, as end accommodating part. The open end of the first leg 31 of the L-shaped individual openings 30, faces the edge 13' of the supporting strips 13, which is the leading edge in the direction of motion 20.

The bottles 8 are supplied parallel to the direction of motion 20 of the endless conveyor 10 in its working compartment of the bottle feeding station 1, and the two in each case first rows 9 of bottles are lifted by means of transfer gripper 35 from the conveying paths 34 and supplied to the two supporting strips 13 in the bottle feeding station 1, which are to be supplied, at the side of their edge 13' facing in the direction of motion 20, as illustrated in FIGS. 8 and 10. With the help of the transfer gripper 35, the bottles are introduced with their necks 25 into the first leg 31 of the respective individual openings 30. With this, the transfer process is ended.

Figure 12:
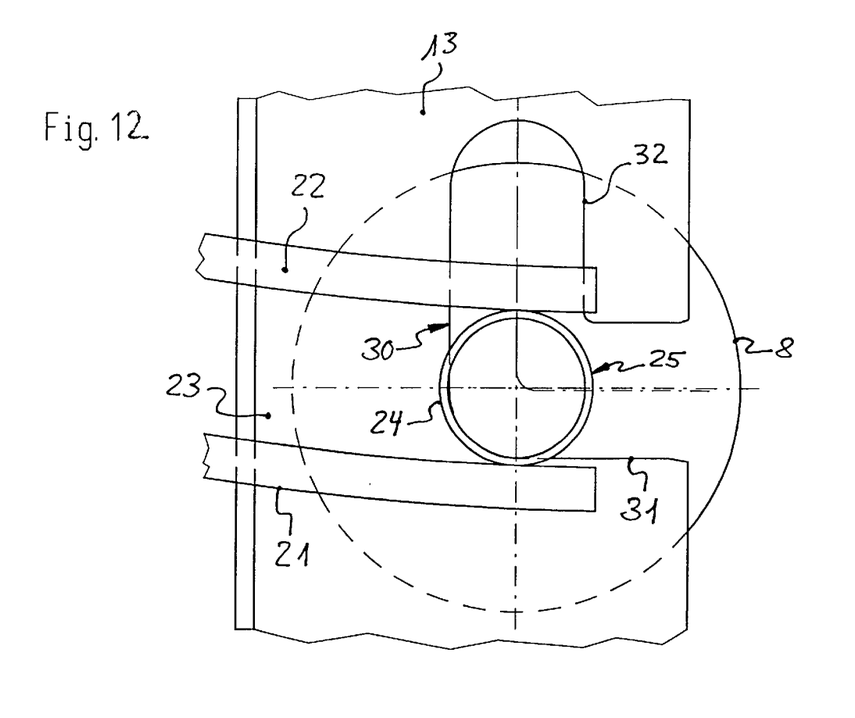
FIG. 12 shows a detail XII of FIG. 11 on an enlarged scale.
Figure 13:
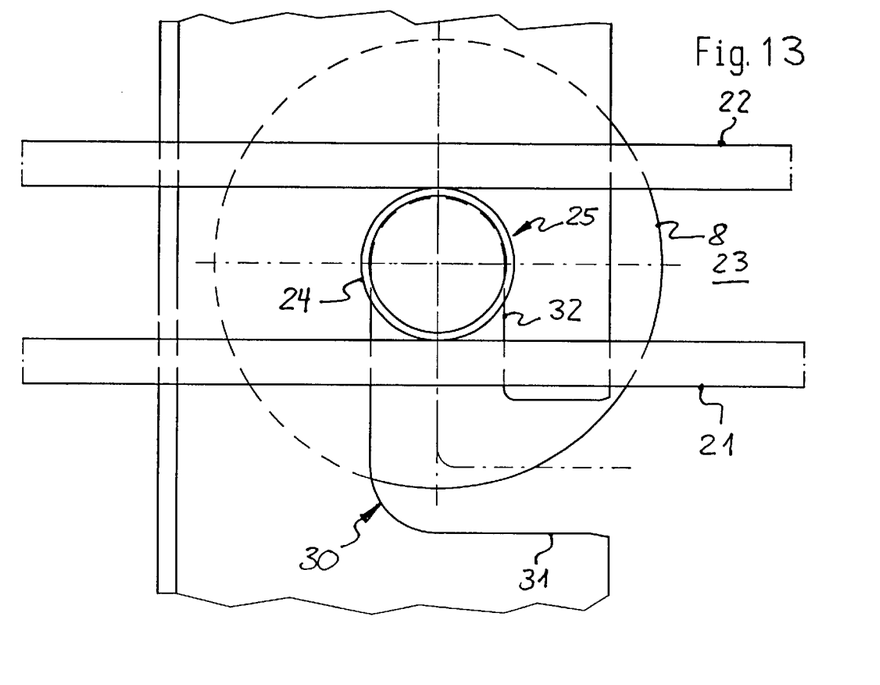
FIG. 13 shows a detail XIII of FIG. 11 on an enlarged scale.
Figure 14:
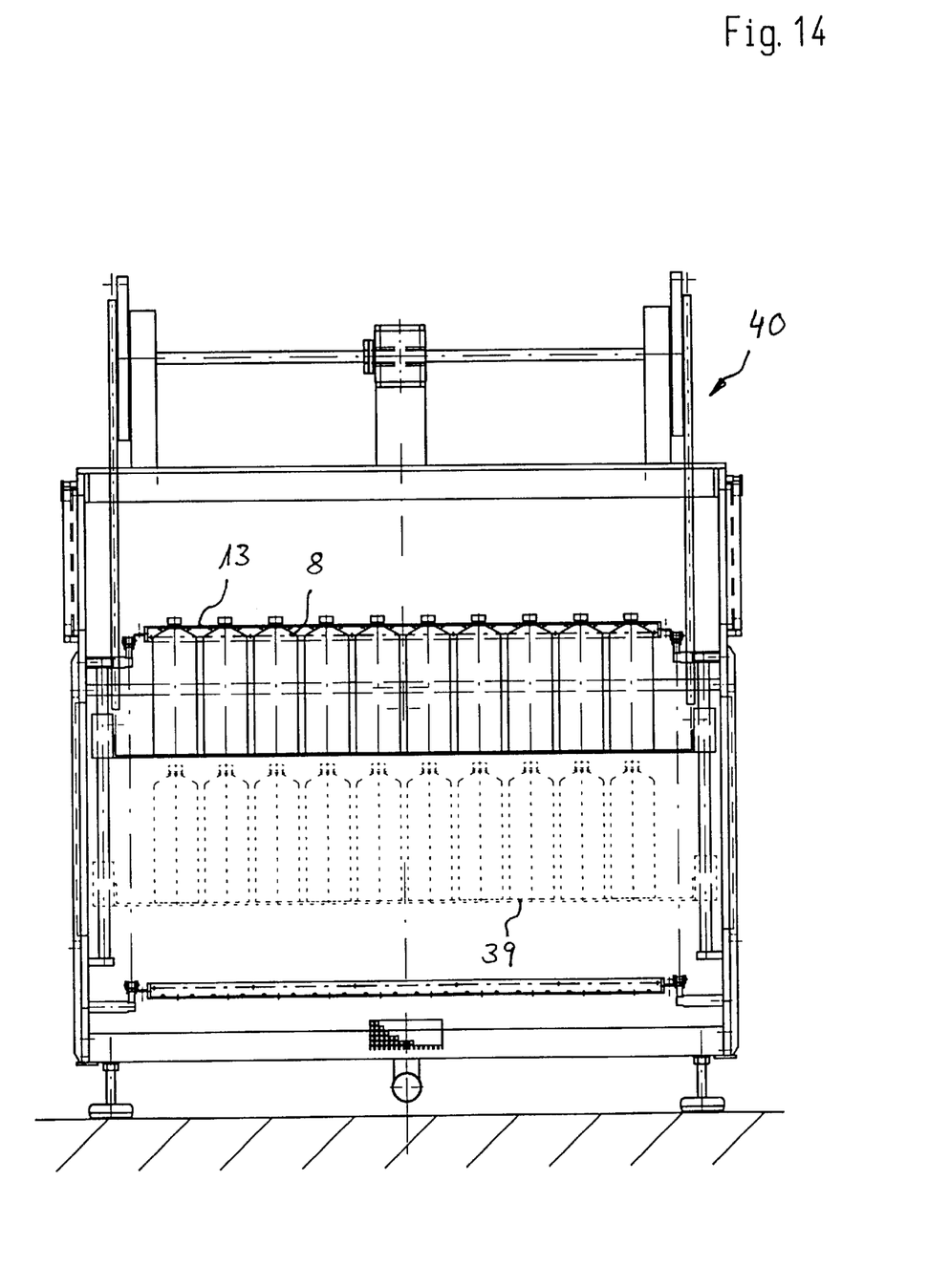
FIG. 14 shows a representation of the installation in section along line XIV—XIV of FIG. 9.
Figure 15:
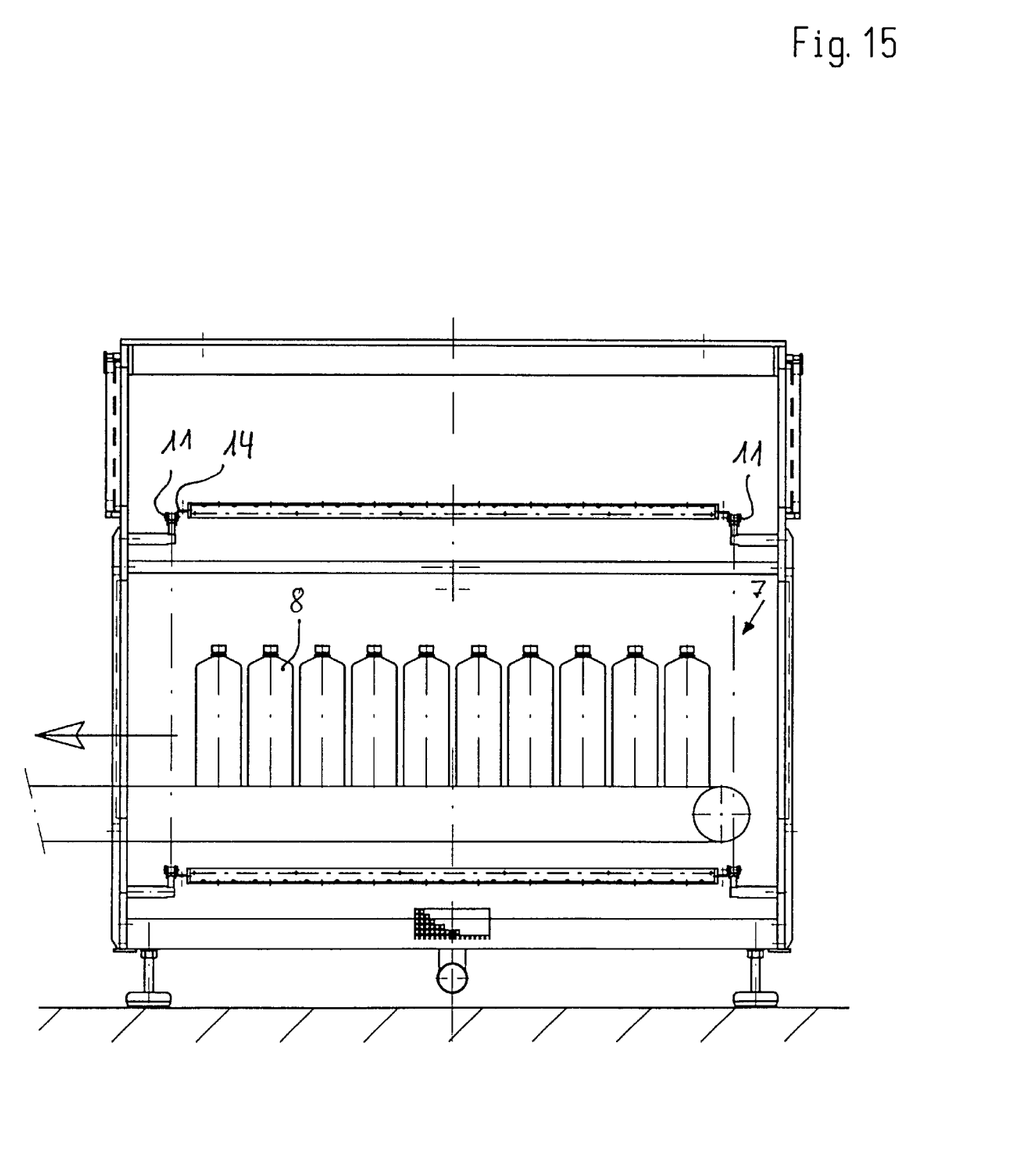
FIG. 15 shows a representation of the installation in section along the line XV—XV of FIG. 9.

Upon movement of the supporting strips 13, so supplied, in the direction of the next processing station, the neck parts 25 of the bottles, protruding upward overt the supporting strips 13, once again reach the inlet ends of the guiding paths 23 which, in the region 26 adjoining the inlet ends, transfer the bottles to the processing distance, the neck parts 25 of the bottles being pressed into the second leg 32 of the individual openings 30 (FIG. 13). At the end of the processing segment, the bottles 8 the bottles 8 are then transferred by the guiding paths 23 in their region 27 once again into an adjoining position, the necks 25 of the bottles once again reaching a position in alignment with the first leg 31 (FIG. 12).

In the bottle delivery station 7, the bottles 8 of a row 9 are pushed jointly by a ram or a slider onto a carrier 39 out of the leg 31 of the individual opening 30 and transferred, the leg being transferred by means of an eccentric drive 40 from an upper receiving station into a lower delivery station, indicated by a broken line in FIG. 9, where the bottles are transferred once again by a ram or slider, the details of which are not shown, onto a conveyor 41, with which the bottles 8 of the transferred row 9 are transferred out of the equipment in the transverse direction.

In the case of this construction with individual openings 30 for in each case one bottle 8 of a row 9, it is also ensured by interaction with the guiding strips 21, 22 and the edges of the individual openings 30 that the bottles not only take up a position at an exact distance from one another as they pass through the processing station or stations, but are also secured against being unintentionally released from the carrying strip 13. This installation also can be operated safely at a high conveying speed and loaded and unloaded simply with bottles.

Figure 16:
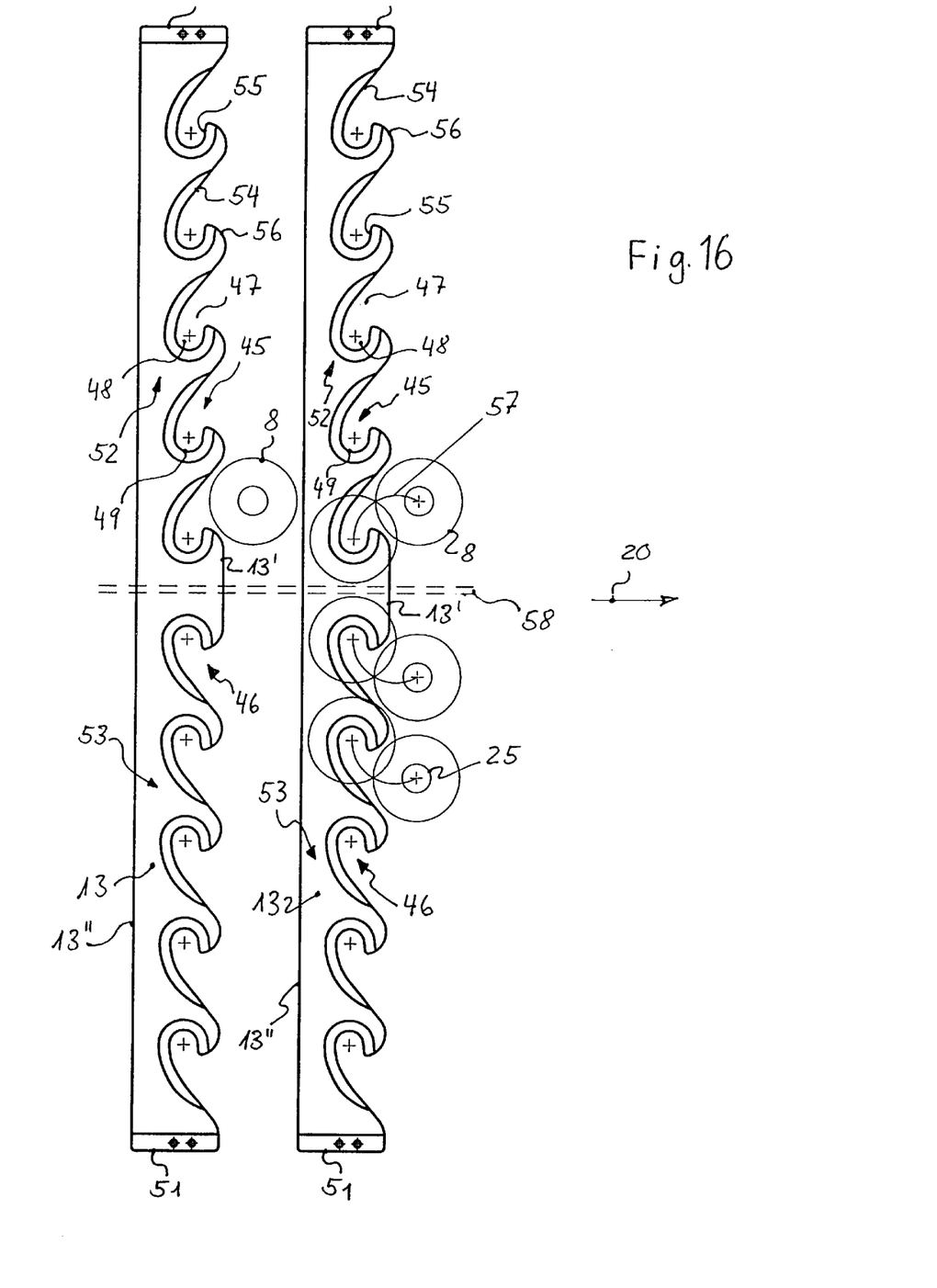
FIG. 16 shows a plan view of two carrying strips with modified individual openings.

For the construction of the modified carrying strips 13, shown in FIG. 16, the individual openings 45 and 46, provided in these carrying strips 13 have an inlet part 47 and an end part 48 for holding the neck parts 25 of the bottles 8 during their transport. The end part 48 is constructed as an approximately semicircular transporting seat, the closed side 49 of which in each case is facing the front ends 50, 51 of the supporting strip 13. The individual openings 45 and 46 belong in each case to one of two groups 52, 53, which are aligned in mirror image fashion to one another and within which the closed sides 49 of the end parts 48 in each case face one or the other front end 50 or 51.

The inlet and outlet part 47 of the individual openings 45, 46 is bounded by opening edges 54, 55, which form an arched slot and lead in each case from the end part 48 to the longitudinal edge 13" facing in the direction of motion 20 of the supporting strips 13 during the transport. At the same time, the one inner opening edge 54, starting out on the side of the closed longitudinal edge 13" of the carrying strip 13 from the end part 48 of the individual openings 45, 46, is taken in an extended arched line to the open longitudinal edge 13' of the carrying strip 13. Upon reaching the open longitudinal edge 13' of the carrying strip 13, this extended arched line of the inner opening edge 54 goes over into an oppositely oriented arched line 56, which runs towards the outer opening edge 55 of the inlet and outlet part 47 of the adjacent individual opening 45 or 45 and, in the vicinity of the end part 48, goes over into the outer opening edge 55.

This special configurational shape of the carrying strips 13 with their individual openings 45, 46 makes is possible not only to introduce the bottles 8 with their neck part 25 by a simple swiveling motion, indicated by the movement arch 57, into the supporting strip, but also to transfer it as far as into the end part 48 and, with that, into the end position, so that it is possible, in principle, to provide guiding strips, which fix the neck parts 25 of the bottles 8 during the transport into their end position in the end part 48 of the carrying strips. The division of the individual openings 45, 46 into mirror image groups 52, 53 in the carrying strip 13 makes it possible to support the carrying strips 13 on a continuous, firm support 58, such as a supporting rail, during the passage through the processing segment, it being possible to hold the distance of the support 58 of neighboring bottles 8 unchanged and equal to the distance of the remaining bottles 8 from one another.

For the slot opening 16 for the construction of FIGS. 1 to 7 and the individual openings 30 in the case of the construction of FIGS. 8 to 15, the bottles 8, during their transport, can be aligned, that is, pulled apart and pushed together again by the carrying strips 13 in the direction at right angles to the direction of motion 20 of the carrying strip 13. On the other hand, the construction of FIG. 16 offers the possibility of inserting the bottles 8 with a single swiveling motion into the carrying strips 13 and of transferring them into an end position, which remains unchanged during the further transport. The removal of the bottles at the end of the treatment segment from the carrying strips 13 is also exceedingly simple and can be carried out with an appropriate swiveling motion in the opposite direction.

What is claimed is:

1. A device for transporting bottles with a carrying ring in the neck region, particularly PET bottles, along a specified path of motion through processing stations (2, 3, 4, 5, 6), of a processing installation particularly a bottle-filling installation, for which in each case a number of bottles (8), grouped in a row (9) transversely to the direction of transport (20), is transported by a carrier (13) and positioned relative to latter, the carriers (13) being movable by conveying chains (11) or similar driving means at uniform intervals consecutively from a bottle feeding station (1) past at least one processing station, especially a filling station, to a bottle delivery station (7) and, from there, empty back to the bottle feeding station, wherein, as carrier for a row (9) of bottles (8), a cellular board-like flat carrying strip (13) is provided, each bottle (8) is supported suspended with its neck (25) in an opening (16; 30) of the carrying strip (13), the carrying ring (24), at the neck (25) of the bottles (8) overlapping the edge of the opening (16; 30) in the carrying strip (13) and wherein, above the plane of motion (15) of the carrying strips (13) on their way between the bottle feeding station (1) and the bottle delivery station (7), guiding strips (21, 22) are provided, which are disposed parallel next to one another, are parallel to the plane of motion (15) and, between themselves, form the boundaries of the guiding paths (23) for the necks parts (25) of the bottles (8), which protrude over the carrying strips (13) and extend between the guiding strips (21), (22).

2. The device of claim 1, wherein the carrying strips (13) have a longitudinal slot (16), which extends essentially over their whole length, is open at one side and forms an opening for jointly accommodating the bottles (8) of a row (9).

3. The device of claim 2, wherein an adjustable stop (17'), which defines the end position of the first of the first bottle (8) of the row (9), conveyed consecutively from the side into the longitudinal slot (16) of the carrying strip (13), is assigned to the closed end (17) of the longitudinal slot (16).

4. The device of claim 1, wherein the carrying strips (13) have a number of bottles (8) in a row (9) corresponding to the number of individual openings (30; 45, 46) for the bottles (8).

5. The device of claim 4, wherein the individual openings have an inlet and outlet part (31; 47), starting from a longitudinal edge (13') of the carrying strip (13) and an end part (32; 48) for accommodating the neck parts (25) of the bottles (8) during the transport.

6. The device of claim 5, wherein the individual openings are constructed L-shaped in plan view and have a first leg (31), which is aligned parallel to the direction of motion (20) of the carrying strips (13) during the transport and adjoins a longitudinal edge (13') of the carrying strip (13), as inlet and outlet part and a second leg (32), extending transversely to the direction of motion (20) of the carrying strip (13) as end part.

7. The device of claim 6, wherein the open end of the first leg (31) of the L-shaped individual openings (30) faces the longitudinal edge (13') of the carrying strip (13), which is the front edge in the direction of motion (20).

8. The device of claim 4, wherein the end part (48) is constructed as a semicircular transporting seat, the closed side of which faces a front end (50, 51) of the carrying strip (13), and the inlet and outlet part is bounded by opening edges (54, 55), leading to a longitudinal edge (13') of the carrying part (13) and forming an arched slot.

9. The device of claim 8, wherein the one inner opening edge (54), starting out on the side of the closed longitudinal edge (13") of the carrying strip (13) from the end part (48) of the individual openings (45, 46), is taken in an extended arched line to the open longitudinal edge (13') of the carrying strip (13).

10. The device of claim 9, wherein the open longitudinal edge (13') of the carrying strip (13), this extended arched line of the inner opening edge (54) goes over into an oppositely oriented arched line (56), which runs towards the outer opening edge (55) of the inlet and outlet part (47) of the adjacent individual opening (45, 46) and, in the vicinity of the end part (48), goes over into the outer opening edge (55).

11. The device of claim 4, wherein the individual openings (30) are assigned to two groups (52, 53), which are aligned in mirror-image fashion to one another, the closed sides (49) of the end parts (48) of the one groups (52) facing the one front end (50) and the other group (53) the other front end (51) of the carrying strip (13).

12. The device of claim 1, wherein the guiding strips (21, 22) form the boundary of guiding paths (23) which, at their inlet ends adjacent to the bottle feeding station (1), lie opposite the necks (25) of mutually adjoining bottles (8) in the row (9), the guiding paths (23), in the region adjoining the inlet ends of the guiding strips (21, 22), due to an arched course, change over to mutual distances from one another, which corresponds to a specified distance between the necks (25) of the bottles (8) of a row (9) in the processing station and wherein, in the region (27) of the outlet ends of the guiding strips (21, 22) adjoining the bottle delivery station (7), the guiding paths (23) are brought together by an arched course, so that the bottles (8) of a row (9) once again assume an adjoining position during the delivery.

13. A device for transporting bottles having a neck and a carrying ring arranged at the neck through at least one processing station, comprising:

carrying strips each arranged to carry a row of bottles, each of said carrying strips including at least one opening for supporting bottles by their necks such that edges of said at least one opening are adapted to underlie the carrying rings of the bottles;

driving means for moving said carrying strips in a direction of motion through the at least one processing station in a plane of movement, said rows of bottles being oriented in a direction transverse to the direction of motion; and pairs of guiding strips arranged above the plane in which said carrying strips move, said guiding strips of each pair being parallel to one another and parallel to the plane in which said carrying strips move, said guiding strips of each pair forming a guiding path therebetween for guiding the necks of the bottles when said at least one opening of said carrying strips supports bottles.

14. The device of claim 13, wherein said driving means comprise conveying chains.

15. The device of claim 13, wherein said driving means are arranged to move said carrying strips at uniform intervals through the at least one processing station.

16. The device of claim 13, wherein said carrying strips are flat.

17. The device of claim 13, wherein said at least one opening of each of said carrying strips is a longitudinal slot extending inward from one transverse edge toward an opposite transverse edge such that said slots are open at one side and closed at an opposite side.

18. The device of claim 17, further comprising an adjustable stop arranged at said closed side of said slots and at a preselected end position relative to said carrying strips, said adjustable stop determining the position of a first one of the bottles in each of said slots.

19. The device of claim 13, wherein said at least one opening comprises a plurality of openings, each of said openings being adapted to support a respective one of the bottles.

20. The device of claim 19, wherein each of said openings has an inlet and outlet part adjoining a longitudinal edge of said carrying strip and an end part for accommodating the neck of a bottle.

21. The device of claim 19, wherein each of said openings has an L-shape having a first leg oriented parallel to the direction of motion of said carrying strip and adjoining a longitudinal edge of said carrying strip and a second leg adjoining said first leg and extending transverse to the direction of motion of said carrying strip for accommodating the neck of a bottle.

22. The device of claim 21, wherein said first leg has an opening facing said longitudinal edge of said carrying strip, said longitudinal edge being a front edge of said carrying strip in the direction of motion of said carrying strips.

23. The device of claim 19, wherein each of said openings has a semicircular transporting seat for accommodating the neck of a bottle, said seat having a closed side facing a lateral edge of said carrying strip, each of said openings further having opening edges leading to a front, longitudinal edge of said carrying strip and forming an arched slot.

24. The device of claim 23, wherein each of said opening edges includes an inner opening edge extending in an arched line from said front edge of said carrying strip.

25. The device of claim 24, wherein said carrying strips include arched lines oriented in an opposite direction to said inner opening edges and arranged between adjacent ones of said openings.

26. The device of claim 25, wherein each of said opening edges further includes an outer opening edge adjoining each of oppositely oriented arched lines.

27. The device of claim 19, wherein said openings comprises first and second groups of openings aligned in mirror-image fashion to one another, each of said openings having an end part having a closed side for supporting the neck of a bottle, said openings in said first group being arranged such that said closed sides of said openings face a first lateral edge of said carrying strip and said openings in said second group of openings being arranged such that said closed sides of said openings face a second lateral edge of said carrying strip opposite to said first lateral edge.

28. The device of claim 13, wherein at least some of said guiding strips have a first arcuate portion proximate a bottle inlet end of said guiding strips, a second arcuate portion proximate a bottle outlet end of said guiding strips and a straight portion between said first and second arcuate portions, said straight portions of said guiding strips being substantially parallel to one another.

29. The device of claim 28, wherein said first arcuate portions of said guiding strips are arranged to increase the spacing between bottles from the bottle inlet end of said guiding strips to said straight portion of said guiding strips and said second arcuate portions of said guiding strips are arranged to reduce the spacing between the bottles from said straight portions of said guiding strips to the bottle outlet end of said guiding strips.

30. A bottle processing installation; comprising:
 a bottle feeding station in which bottles having a neck and a carrying ring arranged at the neck are supplied to the installation;
 a bottle delivery station in which bottles are removed from the installation;
 at least one processing station arranged between said bottle feeding station and said bottle delivery station in which the bottles are processed; and
 a transporting device for transporting bottles from said bottle feeding station to said bottle delivery station through said at least one processing station,
 said transporting device comprising:
  carrying strips each arranged to carry a row of bottles, each of said carrying strips including at least one opening having edges adapted to underlie the carrying rings of the bottles to thereby support the bottles;
  driving means for moving said carrying strips in a direction of motion from said bottle feeding station to said bottle delivery station, said rows of bottles being oriented in a direction transverse to the direction of motion; and
  guiding means for forming a plurality of guiding paths each arranged to guide one bottle of each row of bottles when carried by said carrying strips.

31. The bottle processing station of claim 30, wherein said guiding means comprise pairs of guiding strips, said guiding strips of each pair being parallel to one another and forming one of the guiding paths therebetween for guiding the bottles when said carrying strips carry bottles.

32. The bottle processing installation of claim 30, wherein said at least one processing station is one of a bottle sterilization station, a bottle drying station, a bottle filling station, a bottle lid placement station and a closing station.

33. The bottle processing installation of claim 30, wherein said driving means comprise an endless conveyor comprising chain wheels and conveyor chains running around said chain wheels.

34. The bottle processing installation of claim 33, further comprising connecting pieces for connecting said carrying strips to said conveyor chains.

35. The bottle processing installation of claim 30, wherein said carrying strips are elongate and extend in the direction transverse to the direction of motion of said carrying strips.

36. The bottle processing installation of claim 30, wherein said driving means are arranged to move said carrying strips at uniform intervals from said bottle feeding station to said bottle delivery station.

37. The bottle processing installation of claim 30, wherein said carrying strips are flat.

38. The bottle processing installation of claim 30, wherein said at least one opening of each of said carrying strips is a longitudinal slot extending inward from one transverse edge toward an opposite transverse edge such that said slots are open at one side and closed at an opposite side.

39. The bottle processing installation of claim 38, wherein said transporting device further comprises an adjustable stop arranged at a preselected end position relative to said carrying strips for determining the position of a first one of the bottles in each of said slots.

40. The bottle processing installation of claim 38, further comprising conveyors arranged to deliver bottles into said slots in said carrying strips when said carrying strips are situated in said bottle feeding station.

41. The bottle processing installation of claim 31, wherein said guiding strips are arranged above a plane in which said carrying strips move when carrying bottles.

42. The bottle processing installation of claim 31, wherein at least some of said guiding strips have a first arcuate portion arranged in said bottle feeding station, a second arcuate portion arranged in said bottle delivery station and a straight portion between said first and second arcuate portions, said straight portions of said guiding strips being substantially parallel to one another.

43. The bottle processing installation of claim 42, wherein said first and second arcuate portions are arranged to increase the spacing between bottles from said bottle feeding station to said at least one processing station and reduce the spacing between the bottle from said at least one processing station to said bottle delivery station.

44. The bottle processing installation of claim 30, further comprising conveyors arranged to remove bottles from said carrying strips when said carrying strips are situated in said bottle delivery station.

45. The bottle processing installation of claim 30, wherein said at least one opening comprises a plurality of openings, each of said openings having edges adapted to underlie the carrying rings of a respective one of the bottles.

46. The bottle processing installation of claim 45, wherein each of said openings has an inlet and outlet part adjoining a longitudinal edge of said carrying strip and an end part for accommodating the neck of a bottle.

47. The bottle processing installation of claim 45, wherein each of said openings has an L-shape having a first leg oriented parallel to the direction of motion of said carrying strips and adjoining a longitudinal edge of said carrying strip and a second leg adjoining said first leg and extending transverse to the direction of motion of said carrying strips for accommodating the neck of a bottle.

48. The bottle processing installation of claim 47, wherein said first leg has an opening facing said longitudinal edge of said carrying strip, said longitudinal edge being a front edge of said carrying strip in the direction of motion of said carrying strips.

49. The bottle processing installation of claim 47, further comprising a transfer gripper for transferring bottles into connection with said carrying strips when said carrying strips are situated in said bottle feeding station such that the necks of the bottles are situated in said first leg of said openings.

50. The bottle processing installation of claim 47, wherein said guiding means comprise pairs of guiding strips, said guiding strips of each pair being parallel to one another and forming one of the guiding paths therebetween for guiding the bottles when said carrying strips carry bottles, said guiding strips including an arcuate portion arranged in said bottle feeding station to move bottles in said second leg in the direction transverse to the direction of motion of said carrying strips.

51. The bottle processing installation of claim 45, wherein each of said openings has a semicircular transporting seat for accommodating the neck of a bottle, said seat having a closed side facing a lateral edge of said carrying strip, each of said openings further having opening edges leading to a front, longitudinal edge of said carrying strip and forming an arched slot.

52. The bottle processing installation of claim 45, wherein said edges of said openings each include an inner opening edge facing a front longitudinal edge of said carrying strip and an outer opening edge facing a rear longitudinal edge of said carrying strip.

53. The bottle processing installation of claim 52, wherein said inner opening edges are arcuate, said carrying strips including arcuate portions oriented in an opposite direction to said inner opening edges and arranged between adjacent ones of said openings.

54. The bottle processing installation of claim 45, wherein said openings comprises first and second groups of openings aligned in mirror-image fashion to one another, each of said openings having an end part having a closed side for supporting the neck of a bottle, said openings in said first group being arranged such that said closed sides of said openings face a first lateral edge of said carrying strip and said openings in said second group of openings being arranged such that said closed sides of said openings face a second lateral edge of said carrying strip opposite to said first lateral edge.

55. The bottle processing installation of claim 30, further comprising a carrier arranged in said bottle delivery station onto which bottles are transferred from said carrying strips and a conveyor arranged to receive the bottles from said carrier and remove the bottles from the installation.

* * * * *